(12) United States Patent
Nicholson et al.

(10) Patent No.: US 8,428,409 B2
(45) Date of Patent: Apr. 23, 2013

(54) FILTER FIBER FOR USE IN RAMAN LASING APPLICATIONS AND TECHNIQUES FOR MANUFACTURING SAME

(75) Inventors: Jeffrey W. Nicholson, Warren, NJ (US); Patrick W. Wisk, Green Brook, NJ (US); Man F. Yan, Berkeley Heights, NJ (US)

(73) Assignee: OFS Fitel, LLC, Norcross, GA (US)

( * ) Notice: Subject to any disclaimer, the term of this patent is extended or adjusted under 35 U.S.C. 154(b) by 343 days.

(21) Appl. No.: 12/777,465

(22) Filed: May 11, 2010

(65) Prior Publication Data

US 2010/0284659 A1    Nov. 11, 2010

Related U.S. Application Data

(60) Provisional application No. 61/177,058, filed on May 11, 2009.

(51) Int. Cl.
*G02B 6/02* (2006.01)
(52) U.S. Cl.
USPC .......................................... 385/123; 385/127
(58) Field of Classification Search .................. 385/123, 385/127
See application file for complete search history.

(56) References Cited

U.S. PATENT DOCUMENTS

| | | | |
|---|---|---|---|
| 6,941,054 B2* | 9/2005 | Tirloni et al. | 385/127 |
| 6,952,517 B2 | 10/2005 | Kalish et al. | |
| 7,130,512 B2 | 10/2006 | Kuksenkov et al. | |
| 7,236,672 B2 | 6/2007 | Walton et al. | |
| 8,073,301 B2* | 12/2011 | Gibson et al. | 385/127 |
| 2003/0174987 A1* | 9/2003 | Bickham et al. | 385/127 |
| 2004/0240487 A1* | 12/2004 | Borne et al. | 372/3 |
| 2010/0195194 A1* | 8/2010 | Chen et al. | 359/341.3 |

* cited by examiner

*Primary Examiner* — Hemang Sanghavi
(74) *Attorney, Agent, or Firm* — Law Offices of Jacobs & Kim, LLP

(57) ABSTRACT

An optical waveguide has a refractive index variation that is structured to provide the fiber, over a wavelength operating range, with an effective area supporting multiple Stokes shifts and with a negative dispersion value at a target wavelength within the wavelength operating range. The refractive index variation is further structured to provide the fiber with a finite $LP_{01}$ cutoff at a wavelength longer than the target wavelength, whereby the $LP_{01}$ cutoff wavelength provides a disparity, for a selected bending diameter, between macrobending losses at the target wavelength and macrobending losses at wavelengths longer than the target wavelength, whereby Raman scattering is frustrated at wavelengths longer than the target wavelength.

25 Claims, 12 Drawing Sheets

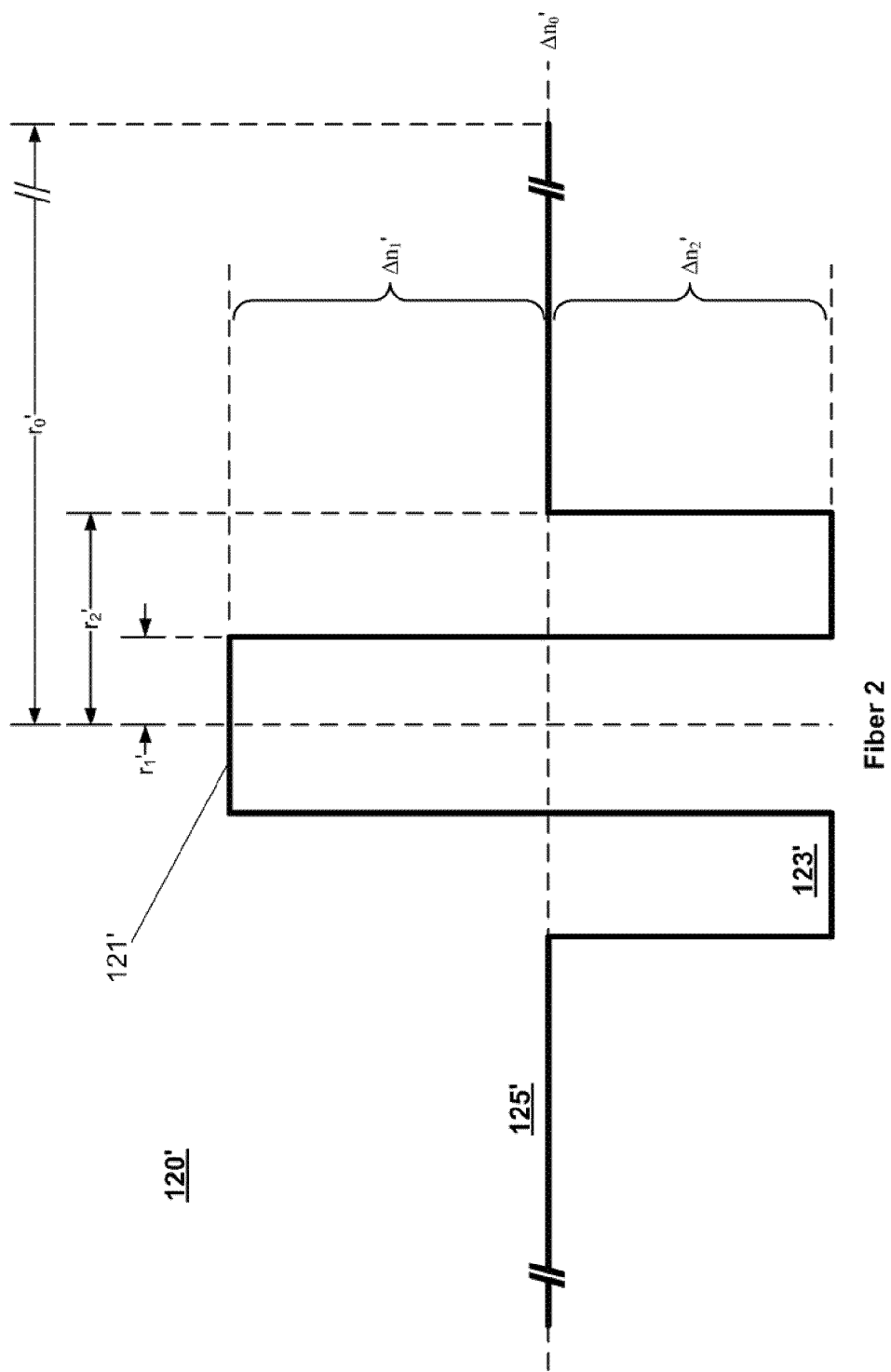

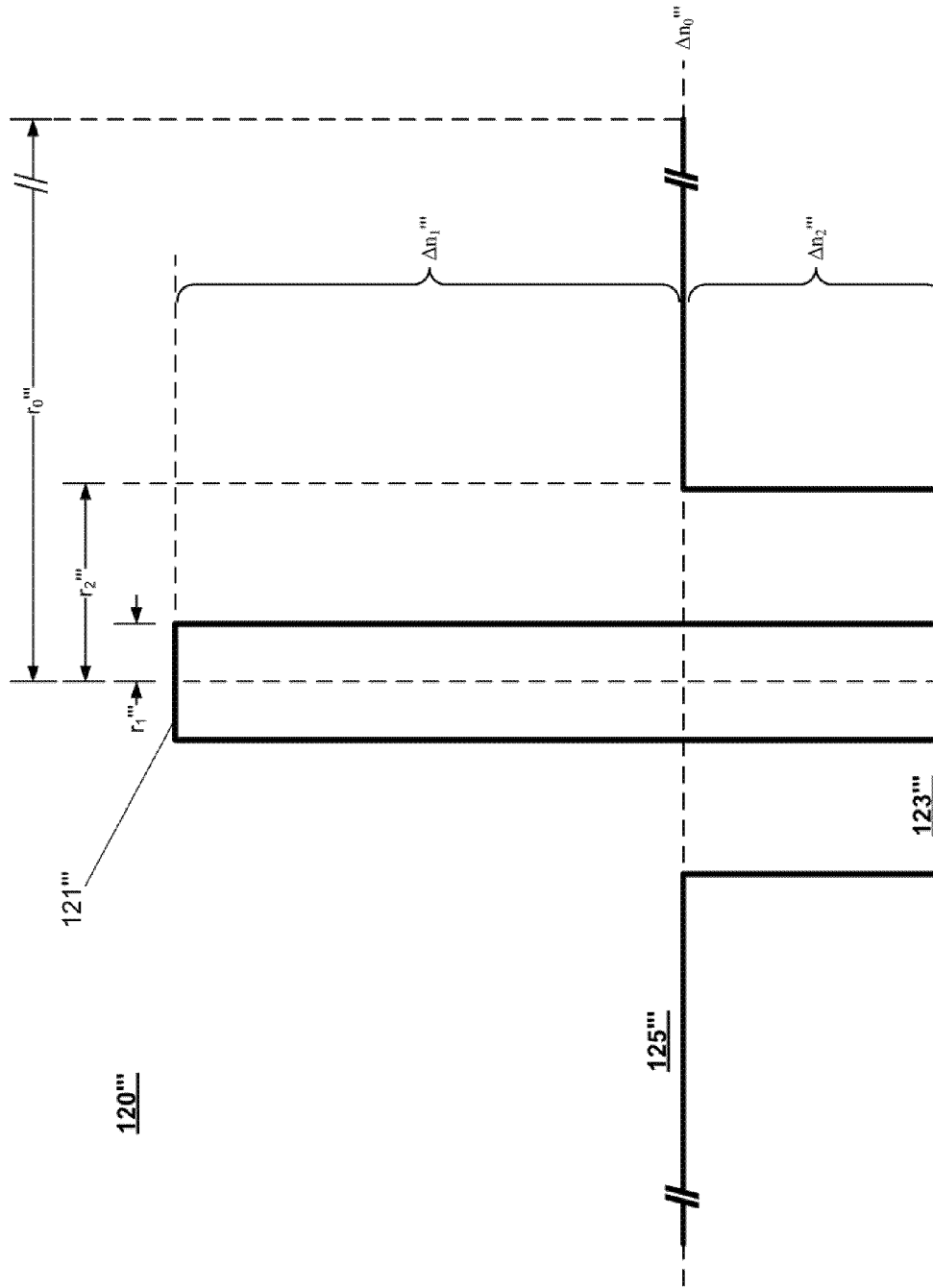

180

| | Core Radius $r_1$ (μm) | Core Index $\Delta n_1$ | Trench Radius $r_2$ (μm) | Trench Index $\Delta n_2$ | $LP_{01}$ Cutoff (nm) | 1480 nm Dispersion (ps/nm/km) | 1480 nm $A_{eff}$ (μm²) |
|---|---|---|---|---|---|---|---|
| Fiber 1 | 2.0 | 0.01308 | 12 | -0.008 | 1590 | -5.82 | 18.23 |
| Fiber 2 | 2.5 | 0.00917 | 6 | -0.008 | 1590 | -10.03 | 25.55 |
| Fiber 3 | 2.0 | 0.01098 | 12 | -0.004 | 1590 | -10.61 | 24.62 |
| Fiber 4 | 1.8 | 0.01529 | 8 | -0.008 | 1590 | -14.38 | 16.13 |

| | Bending Loss (dB/km) 75 mm Radius @1480 nm | Bending Loss (dB/km) 75 mm Radius @1590 nm |
|---|---|---|
| Fiber 1 | $6.75 \times 10^{-4}$ | $6.38 \times 10^2$ |
| Fiber 2 | $1.74 \times 10^2$ | $1.07 \times 10^{17}$ |
| Fiber 3 | $3.48 \times 10^0$ | $3.03 \times 10^5$ |
| Fiber 4 | $2.60 \times 10^{-3}$ | $5.46 \times 10^5$ |

| | Bending Loss (dB/km) 190 mm Radius @1480 nm | Bending Loss (dB/km) 190 mm Radius @1590 nm |
|---|---|---|
| Fiber 1 | $1.45 \times 10^{-13}$ | $3.41 \times 10^2$ |
| Fiber 2 | $8.24 \times 10^{-04}$ | $4.58 \times 10^{16}$ |
| Fiber 3 | $6.23 \times 10^{-06}$ | $1.24 \times 10^5$ |
| Fiber 4 | $1.02 \times 10^{-14}$ | $3.42 \times 10^4$ |

FIG. 8C

FILTER FIBER FOR USE IN RAMAN LASING APPLICATIONS AND TECHNIQUES FOR MANUFACTURING SAME

CROSS REFERENCE TO RELATED APPLICATION

The present application claims the priority benefit of U.S. Provisional Patent Application Ser. No. 61/177,058, filed on May 11, 2009, which is owned by the assignee of the present application, and which is incorporated herein by reference in its entirety.

BACKGROUND OF THE INVENTION

1. Field of the Invention

The present invention relates generally to optical fiber devices and methods, and in particular to improved filter fibers for use in Raman lasing applications and techniques for designing and manufacturing such fibers.

2. Background Art

Fiber lasers and amplifiers are typically based on optical fibers that are doped with laser-active rare earth ions, such as ytterbium (Yb), erbium (Er), neodymium (Nd), and the like. Stimulated Raman scattering in optical fibers is a useful effect that can be employed in order to provide nonlinear gain at wavelength regions in which these rare earth doped fibers do not operate. Stimulated Raman scattering occurs when a laser beam propagates through a Raman-active fiber, resulting in a predictable increase in wavelength, known as a "Stokes shift." By providing a series of wavelength-specific reflector gratings at the input and output ends of a length of a Raman-active fiber, it is possible to create a cascaded series of Stokes shifts in order to convert an input wavelength to a selected target wavelength.

FIG. 1 is a diagram of an exemplary system 20 according to the prior art, in which stimulated Raman scattering is used to generate a high-power output 80 at 1480 nm for pumping an erbium-doped fiber amplifier (EDFA), which provides gain in the 1550 nm region. As illustrated, the system 20 comprises two stages: a monolithic Yb-fiber laser 40 and a cascaded Raman resonator (CRR) 60.

In laser 40, the active medium is provided by a length of a double-clad Yb-doped fiber 42 operating in the region of 1000 nm to 1200 nm. A high reflector grating HR1 is provided at the fiber input end 44, and an output coupler grating OC1 is provided at the fiber output end 46. The portion of fiber 42 between the high reflector HR1 and the output coupler OC1 functions as a laser cavity 48. Pumping energy is provided to fiber 42 by a plurality of pump diodes 50, which are coupled to fiber 42 by means of a tapered fiber bundle TFB1. In the present example, laser 40 provides as an output 52 single-mode radiation at a wavelength of 1117 nm.

The laser output is used to pump the cascaded Raman resonator 60. Resonator 60 comprises a Raman-active fiber 62. A plurality of input gratings 64 are provided at the fiber's input end 66, and a plurality of output gratings 68 are provided at the fiber's output end 70. The plurality of input gratings 64 includes high reflectors HR2-HR6; the plurality of output gratings 68 includes high reflectors HR7-HR11 and output coupler OC2.

Exemplary wavelengths ranging from 1175 nm to 1480 nm are shown for the input high reflectors HR2-HR6, output high reflectors HR7-HR11, and output coupler OC2. As shown in FIG. 1, the input gratings 64 and the output gratings 68 include a nested series of wavelength-matched pairs, separated by a respective Stokes shift. The input gratings 64, output gratings 68, and Raman fiber 62, provides a nested series of Raman cavities 72. While FIG. 1 shows cascaded Raman resonator 60 constructed using gratings 64 and 68, it is well known that similar resonators may be constructed using other wavelength-selective elements, such as fused-fiber couplers, and other architectures, such as WDM loop mirrors.

The 1117 nm output 52 of the Yb-doped fiber laser 40 is launched as an input into the resonator 60, resulting in a cascaded series of Stokes shifts over a broad range, resulting in a stepwise increase in wavelength from the 1117 nm input to a 1480 nm system output 80. One application of the output 80 can then be used to pump a high-power, silica-based erbium-doped fiber amplifier (EDFA) in the fundamental mode, which provides gain in the 1530 to 1590 nm region.

However, in system 20, a certain amount of Raman scattering continues to occur even after the target wavelength has been achieved. Thus, at higher powers, a significant amount of pumping energy may be lost because of light being transferred to the next, unwanted, higher-order Stokes shift. This unwanted Stokes shift limits the amount of power that can be obtained at the desired output wavelength. Furthermore, if the output 80 of the CRR is used to pump an EDFA, the unwanted higher-order Stokes shift can potentially interfere with signal wavelengths being amplified in the EDFA.

SUMMARY OF THE INVENTION

These and other issues of the prior art are addressed by the present invention, aspects of which are directed to filter fibers for use in Raman lasing applications and techniques for designing and manufacturing such fibers.

According to one practice of the invention, an optical fiber, comprises an optical waveguide having a refractive index variation that is structured to provide the fiber, over a wavelength operating range, with an effective area supporting multiple Stokes shifts and with a negative dispersion value at a target wavelength within the wavelength operating range. The refractive index variation is further structured to provide the fiber with a finite $LP_{01}$ cutoff at a wavelength longer than the target wavelength, whereby the $LP_{01}$ cutoff wavelength provides a disparity, for a selected bending diameter, between macrobending losses at the target wavelength and macrobending losses at wavelengths longer than the target wavelength, whereby Raman scattering is essentially prevented at wavelengths longer than the target wavelength.

Further aspects of the invention are described below.

BRIEF DESCRIPTION OF THE DRAWINGS

FIGS. 3, 3A, 3B, and 3C show refractive index profiles, drawn approximately to scale, for four exemplary fibers according to aspects of the invention.

FIGS. 8A-8C are a series of tables setting forth specifications for four exemplary fiber designs.

DETAILED DESCRIPTION

There are now described specific examples, in accordance with various aspects of the invention, of filter fibers for use in high-power Raman lasing applications, and of techniques for designing and manufacturing such fibers.

Figure 1:
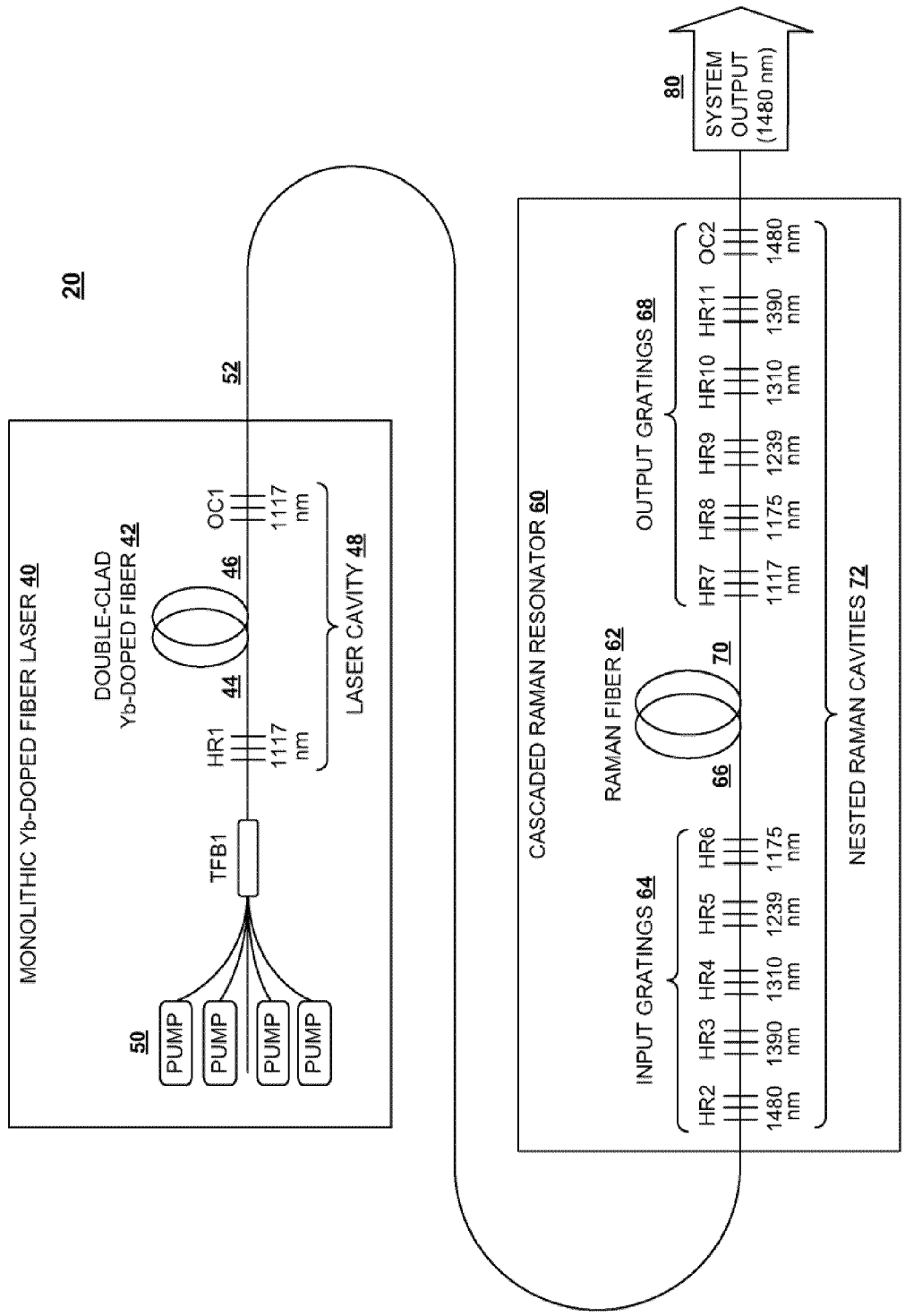
FIG. 1 is a diagram of a cascaded Raman resonator system according to the prior art.

Raman lasing system 20 shown in FIG. 1, discussed above, is used to provide context for the present discussion. Specifically, for the sake of the present discussion, it is contemplated that a filter fiber constructed according to the techniques described herein may be used, for example, in place of Raman fiber 62 in CRR 60. In that case, a CRR would be fabricated by providing a suitable length of the filter fiber, and providing at the input and output ends of the fiber suitable sets of input and output gratings having wavelengths configured to produce a cascaded series of Stokes shifts, resulting in the stepwise conversion of an input wavelength to a desired target wavelength.

It will be appreciated, however, that the presently described filter fibers and techniques may be practiced with respect to other Raman lasing systems and configurations. For example, the invention may be practiced in conjunction with any of the lasing systems, or variations thereof, described in U.S. Provisional Patent Application Ser. No. 61/177,058, filed on May 11, 2009, which is owned by the assignee of the present application, and which is incorporated herein by reference in its entirety.

As discussed in detail below, a filter fiber according to the present invention is structured to allow, over a wavelength operating range, multiple Stokes shifts without supercontinuum generation. Such a filter fiber is structured to prevent deleterious pump energy depletion to wavelengths beyond a target wavelength, resulting from Raman scattering through higher order Stokes shifts.

These desired characteristics are achieved by structuring a filter fiber to include the following attributes:

(a) a normal (i.e., negative) dispersion throughout its operating range, in order to avoid supercontinuum generation;

(b) a small effective area at the target wavelength, i.e., an effective area that is small enough to allow multiple Stokes shifts over the wavelength operating range at a desired power level;

(c) acceptably low loss at fiber lengths of 100 meters or greater; and (d) a finite $LP_{01}$ mode cutoff at a wavelength longer than a target wavelength, whereby the $LP_{01}$ cutoff wavelength provides a disparity, for a selected bending diameter, between macrobending losses at the target wavelength and macrobending losses at wavelengths longer than the target wavelength.

Note that the present discussion makes use of the dispersion parameter, D, which has units of ps/(nm-km). A negative value of D constitutes normal dispersion, and a positive value of D constitutes anomalous dispersion. In the anomalous dispersion regime phenomena such as modulation instability and soliton formation occur, neither of which are present in the normal dispersion regime. Note that standard single-mode fiber has a zero-dispersion wavelength around 1300 nm and anomalous dispersion at wavelengths longer than the zero-dispersion wavelength.

According to a practice of the invention, the $LP_{01}$ cutoff is at a wavelength that is at between one-half and one Stokes frequency shift beyond the target wavelength, whereby, for a given spool diameter (e.g., 75 mm, 190 mm), the selected $LP_{01}$ mode cutoff results in a large disparity between macrobending losses (e.g., less than 0.01 dB/km) at the target wavelength and macrobending losses (e.g., greater than 300 dB/km) at the first Stokes shift.

According to an aspect of the present invention, these fiber attributes are accomplished through the use of a W-shaped refractive index profile. It will be appreciated that aspects of the invention, as described herein, are practicable using other refractive index profile shapes and other refractive index variations.

W-shaped filter fibers, in which the LP01 mode cannot be guided above a selected cutoff wavelength, have been used for S-band erbium-doped fiber amplifier (EDFA) applications. W-shaped filter fibers have also been used to suppress Raman scattering in high-power Yb fiber amplifiers. In neither of these earlier applications is the dispersion of the filter fiber over a broad wavelength range an important consideration.

A Raman lasing application requires Raman gain at discrete frequencies. However, when a sufficiently high power launches into a fiber with an anomalous dispersion, instead of Raman gain at discrete frequencies, supercontinuum generation may occur due to modulation instability. Therefore, a fiber according to the present invention is structured to exhibit normal dispersion over the wavelength operating range.

Because Raman gain in a given fiber is related to pump power intensity, Raman gain is inversely proportional to the modal effective area of the fiber. Therefore, a fiber according to the present invention is structured to have a small effective area. However, since the fiber lengths in Raman lasers tend to be on the order of 100 meters or more, the power loss of the fiber also plays an important role.

Thus, a filter fiber according to the present invention is structured significantly differently from earlier filter fibers in order to provide a fiber having a small effective area, low loss, and normal dispersion to facilitate Raman scattering to a desired target wavelength. The fiber uses the filtering properties of the LP01 mode cutoff to frustrate Raman scattering at wavelengths longer than a desired target wavelength.

There are now described specific techniques for designing filter fibers structured to have the above attributes. For the purposes of the present discussion, it is assumed that the desired target wavelength is 1480 nm, and that the first Stokes shift after 1480 nm is 1590 nm. However, it will be apparent from the present description that the described fibers and techniques may be adapted for use at other wavelengths.

Figure 2:
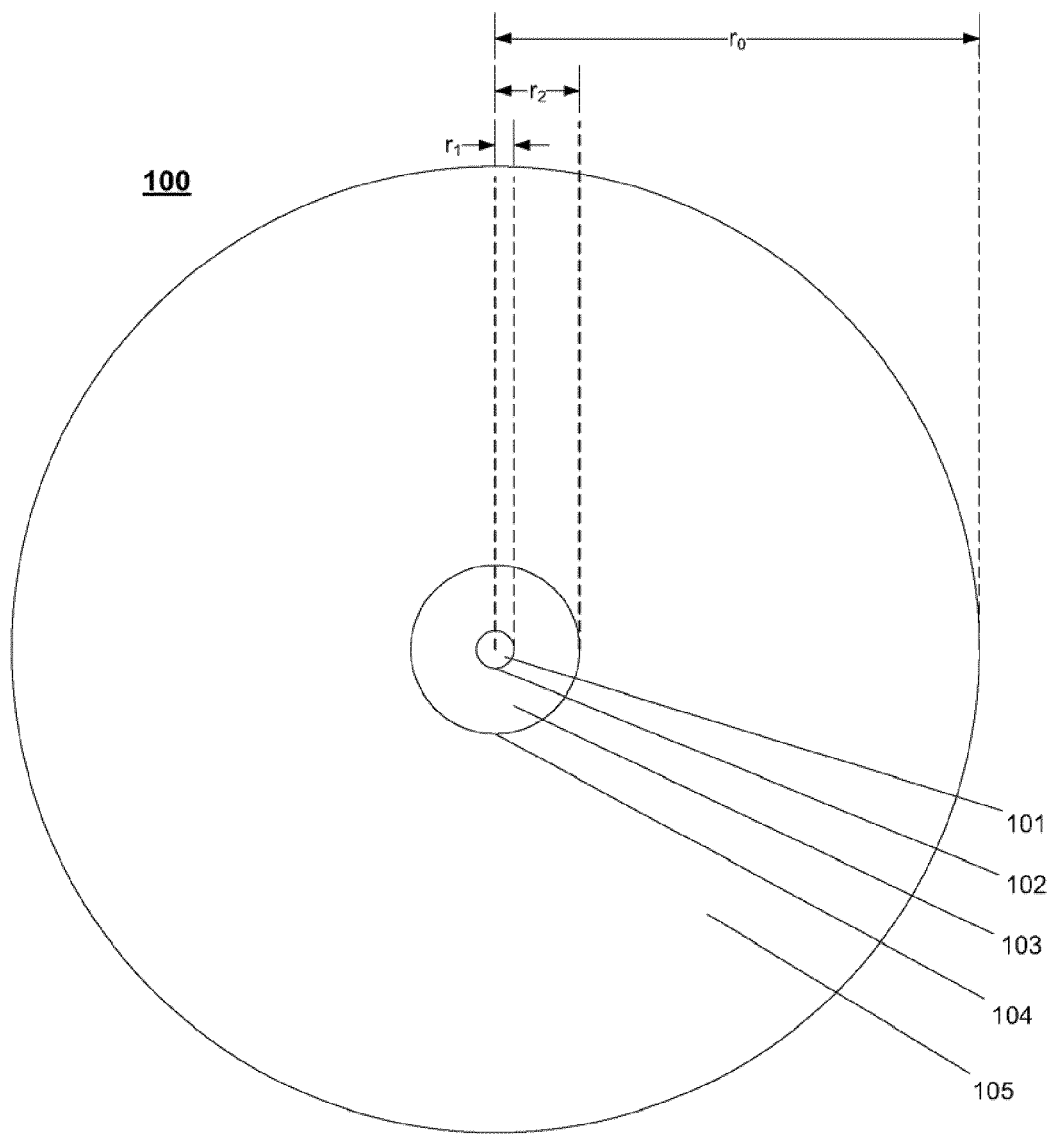
FIG. 2 is a cross section, not drawn to scale, according to an aspect of the invention.

FIG. 2 shows a cross section, not drawn to scale, of an example of a fiber 100 according a first aspect of the invention. Fiber 100 comprises an optical waveguide fabricated from silica ($SiO_2$), or other suitable material, that is chemically doped to create a plurality of distinct concentric regions:

a core 101, having an outer radius $r_1$ and a refractive index $n_1$;

inner cladding 103, surrounding the core 101, having an outer radius $r_2$ and refractive index $n_2$; and outer cladding 105, surrounding the inner cladding 103, having an outer radius $r_0$ and refractive index $n_0$.

Also shown in FIG. 2 are the core-inner cladding boundary 102, and the inner cladding-outer cladding boundary 104.

Each of the fiber regions has a respective "refractive index difference" Δn, which is determined using the outer cladding refractive index $n_0$ as a reference value:

for outer cladding 105, $\Delta n_0 = n_0 - n_0 = 0$;
for core 101, $\Delta n_1 = n_1 - n_0$;
for inner cladding 103, $\Delta n_2 = n_2 - n_0$.

Figure 3:
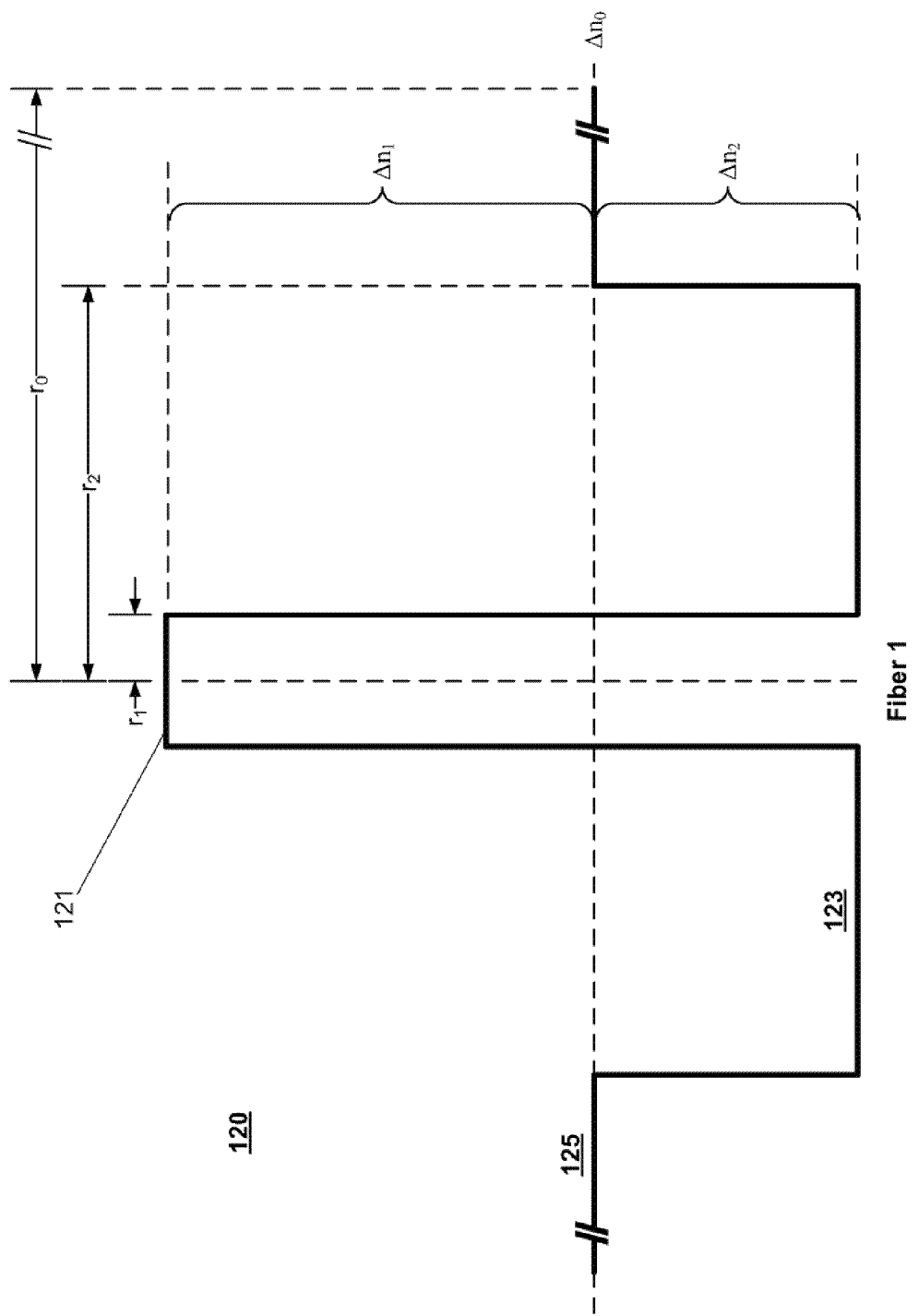

FIG. 3 is a refractive index profile (RIP) 120, drawing approximately to scale, for a first exemplary fiber according to aspects of the present invention. RIP 120 illustrates, in graphical form, the respective outer radii $r_0$-$r_2$ and refractive index differences $\Delta n_0$–$\Delta n_2$ for the fiber regions 101, 103, 105.

RIP 120, as shown in FIG. 3, is conventionally referred to as a W-shaped profile. It includes a central spike 121, corresponding to core 101, having a relatively narrow outer radius $r_1$ and a relatively large positive refractive index difference $\Delta n_1$. Central spike 121 is surrounded by a trench 123, corresponding to inner cladding 103, having a relatively large outer radius $r_2$ compared with the core outer radius $r_1$, and having a relatively small negative refractive index difference $\Delta n_2$ (relative to $\Delta n_0$). Trench 123 is surrounded by a relatively flat outer region 125, corresponding to outer cladding 105, having an outer radius $r_0$ and refractive index difference $\Delta n_0$.

Figure 3B:
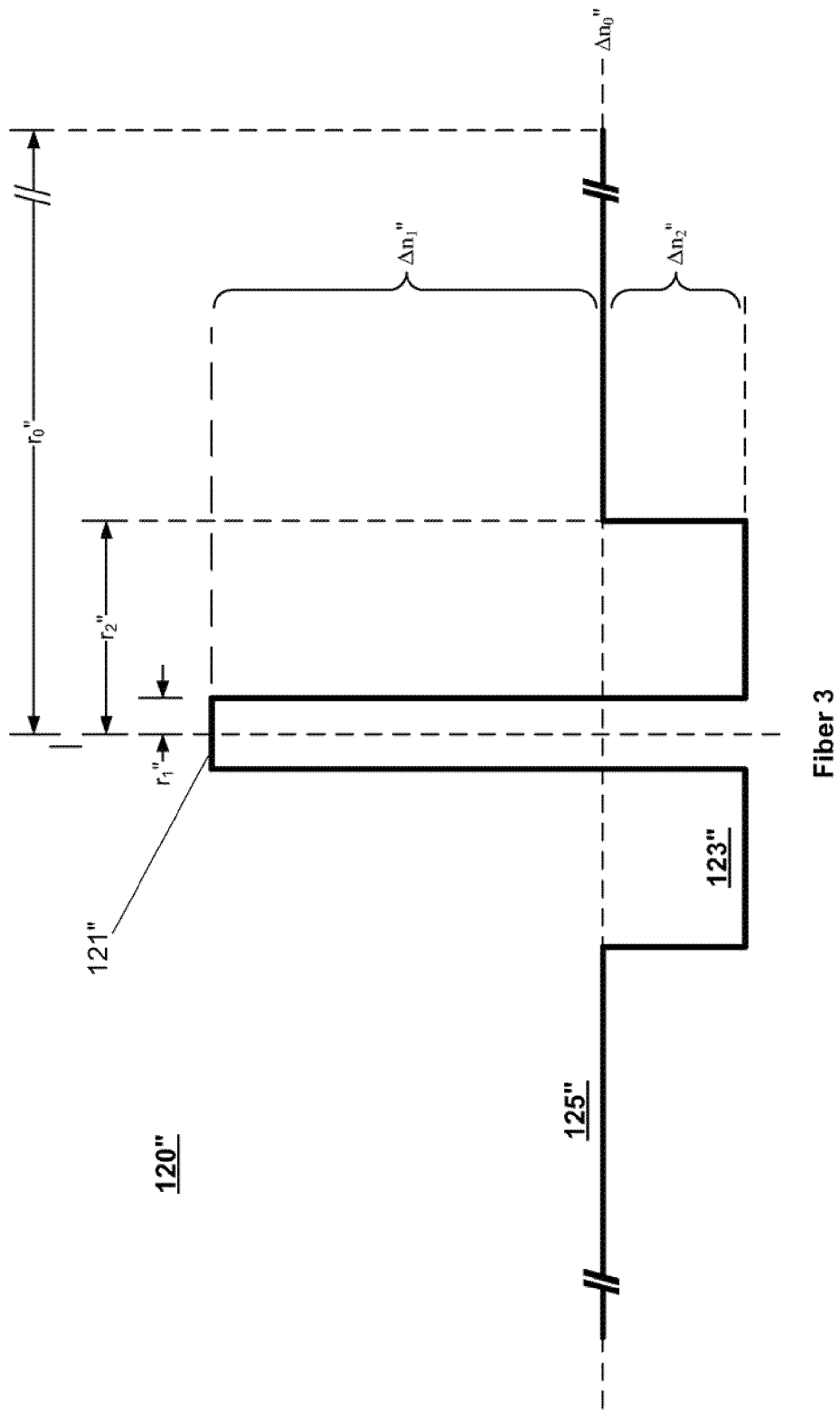

FIGS. 3A-3C show refractive index profiles 120' and 120", drawn approximately to scale, of second and third examples of fibers according to further aspects of the invention. Both RIPS 120' and 120" are W-shaped, including a central peak 121'/121", a trench 123'/123", and an outer cladding 125'/125", and have respective values for $r_0''/r_0''$, $r_1'/r_1''$, $r_2'/r_2''$, $\Delta n_0'/\Delta n_0''$, $\Delta n_1'/\Delta n_1''$, and $\Delta n_2'/\Delta n_2''$ that achieve the desired filtering effect.

There are now described techniques for arriving at a suitable refractive index profile for a given target wavelength.

In the Raman filter fiber designs described herein, the pump energy provides gain at the target wavelength, and is not depleted by higher-order Stokes scattering beyond the target wavelength. For the purposes of the present discussion, it is assumed that the desired target wavelength is 1480 nm, and that the first Stokes shift after 1480 nm is 1590 nm. However, it will be apparent from the present description that the described fibers and techniques may be adapted for use at other wavelengths.

A filter fiber according to the present invention is structured to provide a significant disparity in macrobending losses at the target wavelength, i.e., 1480 nm, compared with macrobending losses at the first Stokes shift wavelength, i.e., 1590 nm. The presently described Raman filtering application makes use of this attenuation disparity.

In use, a Raman fiber is typically wound onto a spool having a known diameter. Thus, in a typical Raman lasing application, a Raman fiber is subjected to macrobending losses at known bending diameters.

Figure 4:
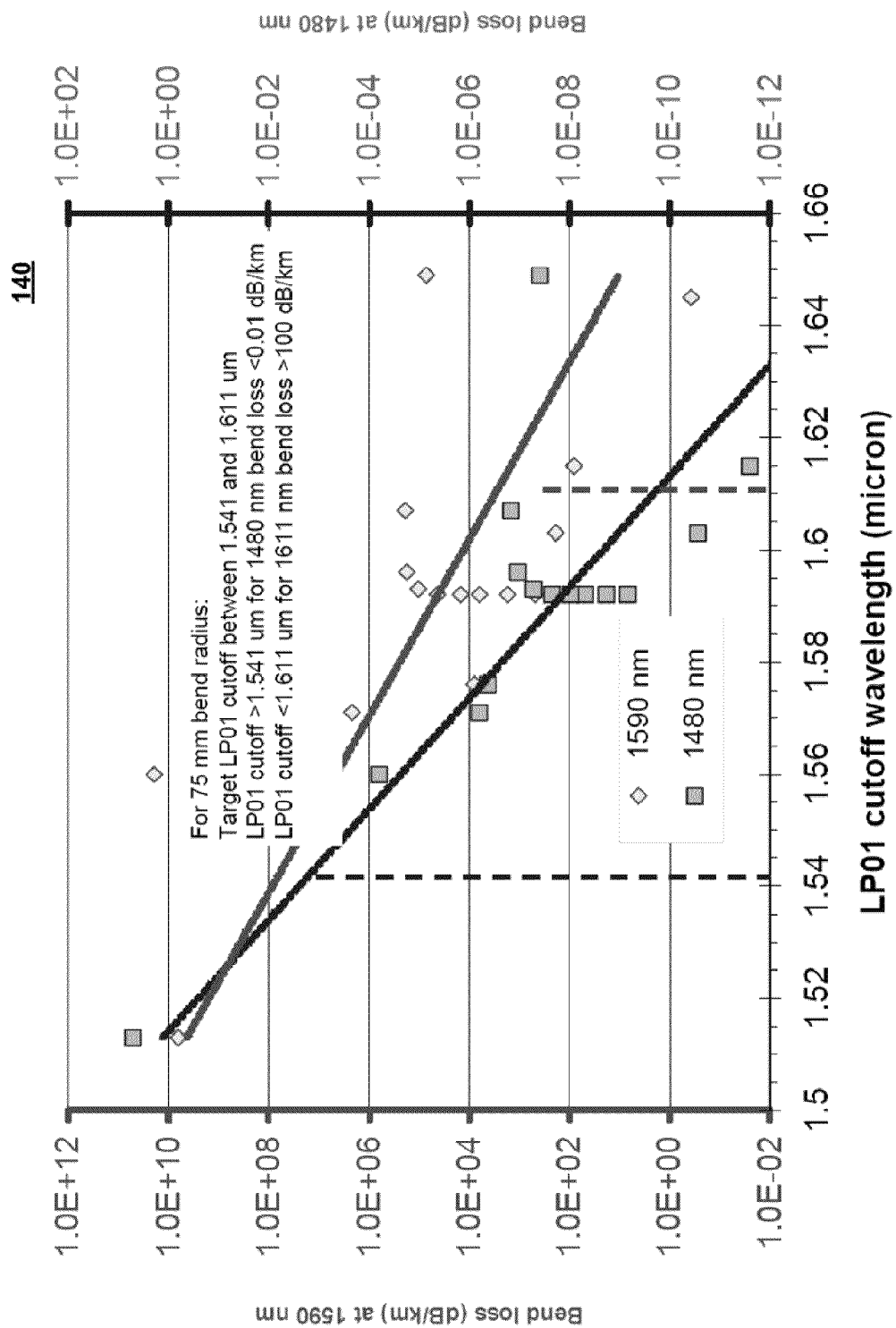
FIG. 4 and FIG. 5 are a pair of graphs illustrating the relationship between the $LP_{01}$ cutoff wavelength and the resulting macrobending losses at 1480 nm and 1590 nm, evaluated respectively at spool diameters of 75 mm and 190 mm.
Figure 5:
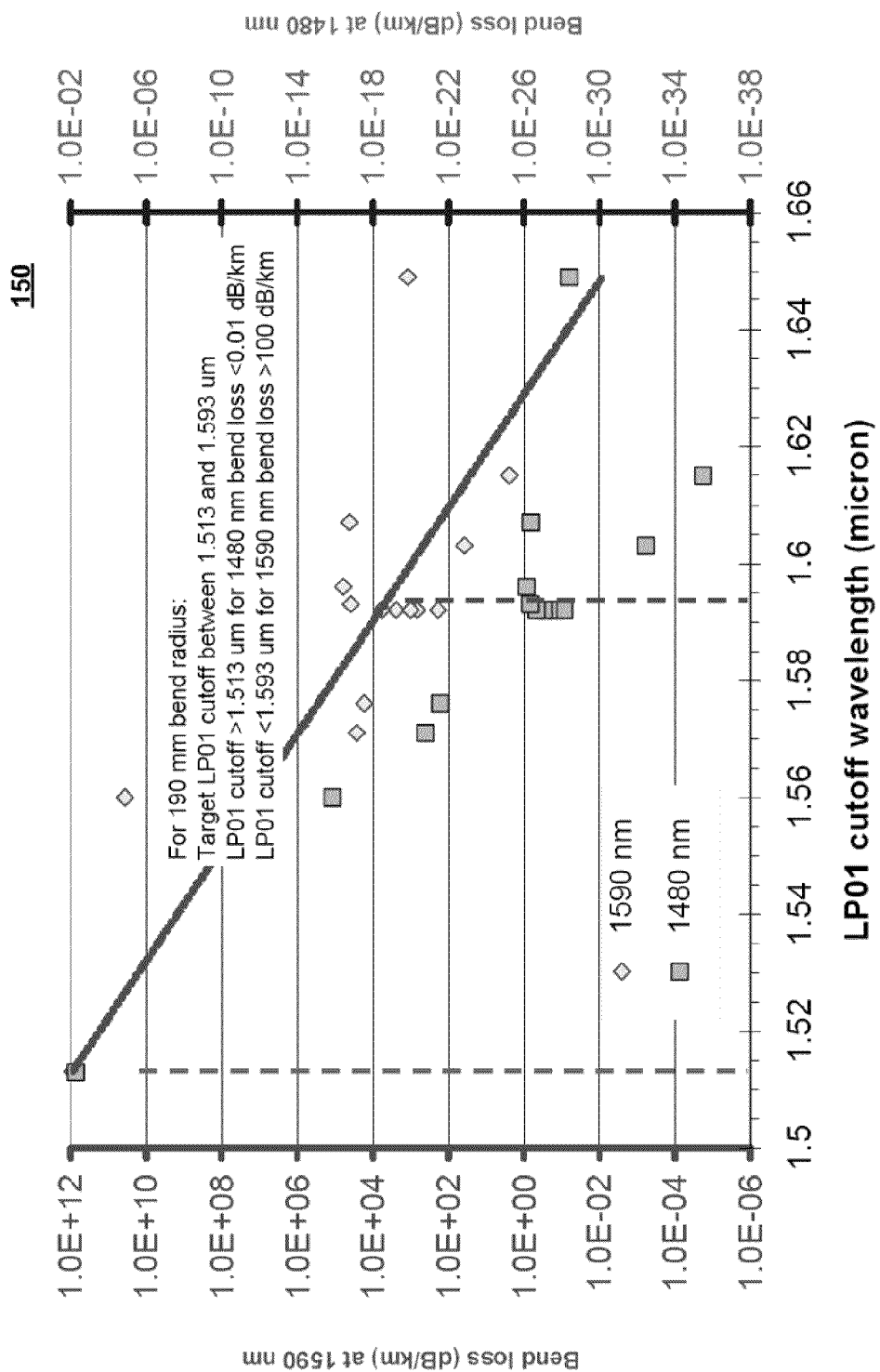

FIG. 4 and FIG. 5 are a pair of graphs 140 and 150 illustrating the relationship between the $LP_{01}$ cutoff wavelength and the resulting macrobending losses at 1480 nm and 1590 nm, evaluated respectively at spool diameters of 75 mm (FIG. 4) and 190 mm (FIG. 5).

Graph 140 shown in FIG. 4 shows that when the $LP_{01}$ cutoff wavelength is between 1540 nm and 1610 nm, the Raman fiber wound onto a 75 mm diameter spool is expected to have less than 0.01 dB/km macrobending loss at 1480 nm and greater than 100 dB/km macrobending loss at 1590 nm. Similarly, graph 150 shown in FIG. 5 shows that when the $LP_{01}$ cutoff wavelength is between 1510 nm and 1590 nm, the Raman fiber wound onto a 190 mm diameter spool is expected to have less than 0.01 dB/km macrobending loss at 1480 nm and greater than 100 dB/km macrobending loss at 1590 nm. The depicted $10^4$ order of magnitude difference in attenuation between the target wavelength and the Stokes wavelength provides a significant filtering effect to frustrate higher-order Raman scattering. According to a practice of the invention, power at the next Stokes order is less than, or comparable to, the previous Stokes orders, which are 20 dB lower than the output wavelength.

Figure 6:
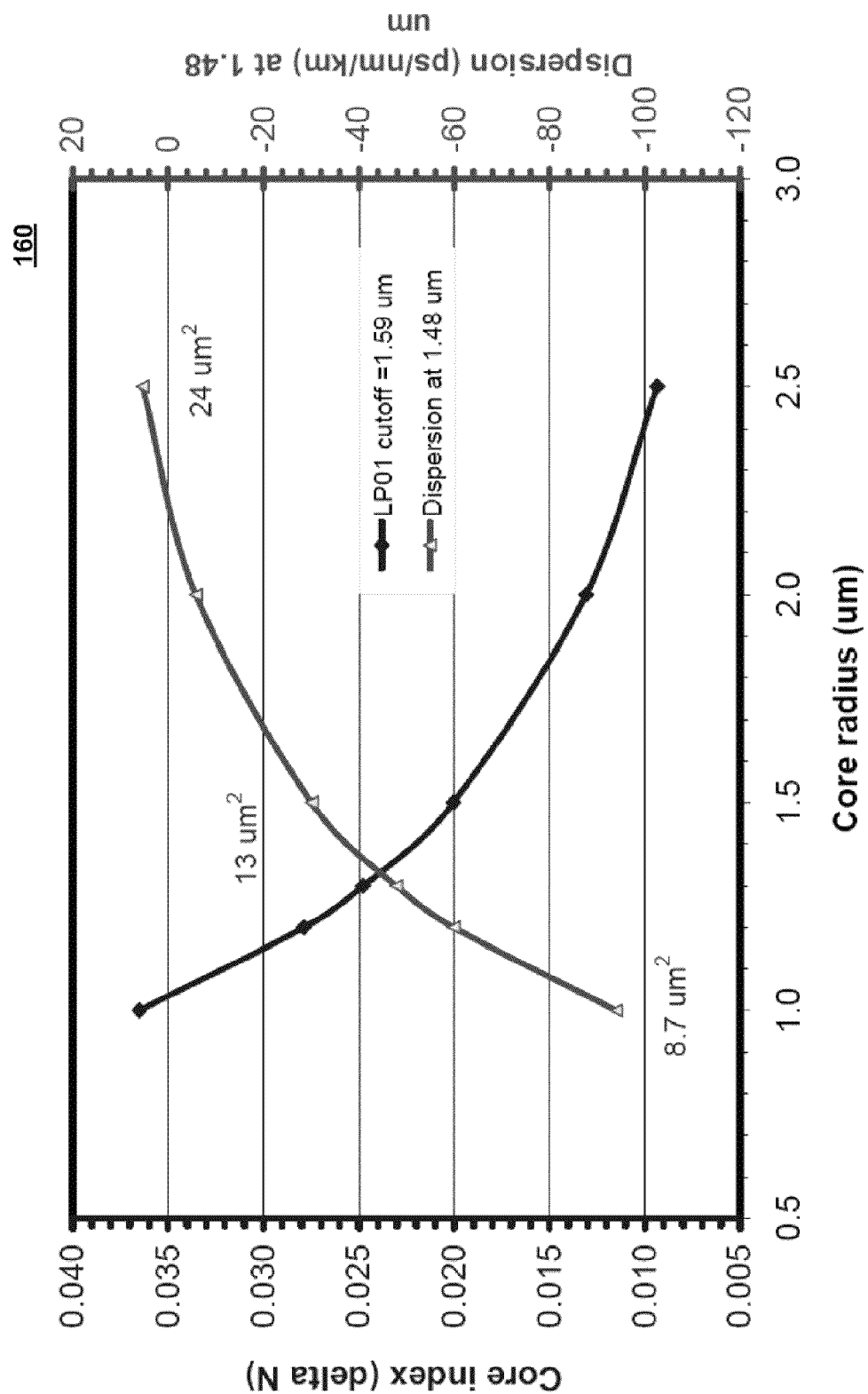
FIG. 6 is a graph showing the contour of core radius and core index in W-shaped index profiles that result in a constant $LP_{01}$ cutoff wavelength at 1590 nm.

FIG. 6 is a graph 160 showing the contour of core radius and core index in W-shaped index profiles, such as those shown in FIGS. 3A-3C, that result in a constant $LP_{01}$ cutoff wavelength at 1590 nm. In these W-shaped designs, the core is surrounded by a trench region that has −0.008 Δn index difference and 12 μm outer radius. The trench region is further surrounded by undoped silica. FIG. 6 also shows the chromatic dispersion at 1480 nm, with the scale shown on the right vertical axis, for the fiber designs that yield the 1590 nm $LP_{01}$ cutoff wavelength. The effective areas at 1480 nm are also shown. This figure identifies the design space in terms of core radius and core index in such W-shaped index profiles to have the above attributes. While these designs were made for the target wavelength at 1480 nm with the Stokes wavelength at 1590 nm, similar designs can be made for applications at other target wavelengths. At 75 mm spool diameter, these designs show macrobending loss less than 0.01 dB/km at 1480 nm and greater than 300 dB/km at 1590 nm.

Other trench radius and trench index can be used for the W-shaped filter fiber designs. In general, a smaller outer trench radius and smaller trench index magnitude increases both the effective area and the macrobending losses. The following table shows comparison of properties in designs with different trench index and trench outer radius while maintaining the same 1590 nm $LP_{01}$ cutoff. By using a larger spool diameter of 190 mm, the Raman filter fiber can have a larger effective area while maintaining the desirable negative dispersion and low bend loss at 1.48 μm. It is also desirable to choose designs with a smaller core index that generally reduces the fiber attenuation.

Figure 7:
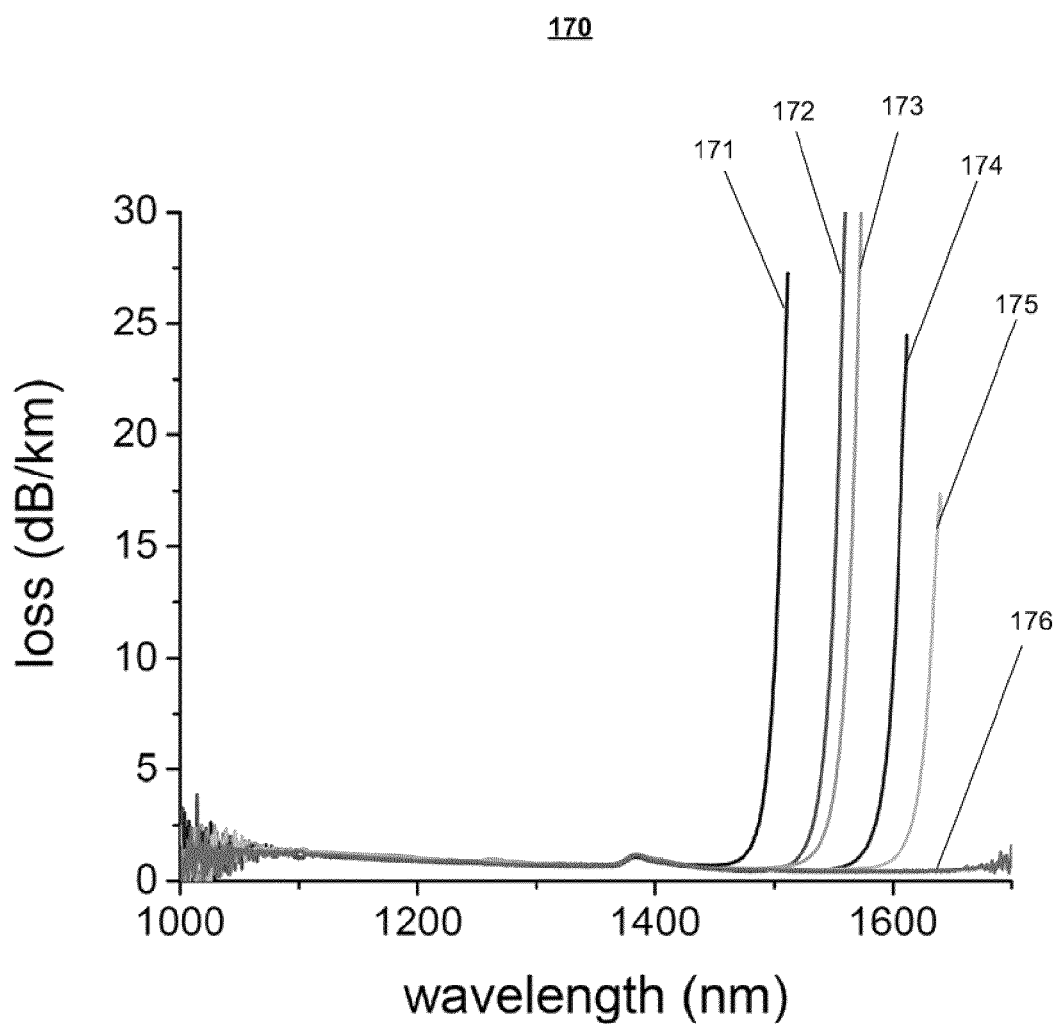
FIG. 7 is a graph illustrating the relationship between attenuation and wavelength in a prototype filter fiber design according to the present invention.

FIG. 7 is a graph 170 illustrating the relationship between attenuation and wavelength in a prototype filter fiber design according to the present invention. Experimental data was generated for a number of different outer cladding diameters: 120 μm (curve 171); 121 μm (curve 172); 122 μm (curve 173); 125 μm (curve 174); 130 μm (curve 175) and 140 μm (curve 176). Since these fibers were drawn from the same preform, their core diameters are proportional to the cladding diameters, and for example, the core diameter in the 140 μm clad diameter fiber is about 16.7% larger than that in the 120 μm clad diameter fiber. Curves 171-176 illustrate the described filtering effect: the filter fiber has a low attenuation below a cutoff wavelength, and high attenuation above the cutoff wavelength. Curves 171-176 further illustrate that the outer cladding diameter is an additional parameter to be considered in designing a filter fiber with a desired cutoff wavelength. For example, modifying the outer cladding diameter may be used towards the end of the design process to make fine adjustments to the cutoff wavelength.

FIGS. 8A-8C are a series of tables 180-182 setting forth specifications and measured performance of the four exemplary fibers discussed above with respect to FIGS. 3, 3A, 3B and 3C. The table 180 set forth in FIG. 8A sets forth the following details for Fiber 1 (FIG. 3), Fiber 2 (FIG. 3A), Fiber 3 (FIG. 3B), and Fiber 4 (FIG. 3C):

(a) core radius $r_1$ (μm);
(b) core refractive index difference $\Delta n_1$;
(c) trench radius $r_2$ (μm);
(d) trench refractive index difference $\Delta n_2$;
(e) $LP_{01}$ cutoff wavelength (nm);

(f) dispersion at 1480 nm (ps/nm/km);
(g) effective area $A_{eff}$ at 1480 nm ($\mu m^2$)

Table 181 set forth in FIG. 8B sets forth bending loss, for the four fibers, at 1480 nm and 1590 nm at a bending radius of 75 mm. Table 182 set forth in FIG. 8C sets forth bending loss, for the four fibers, at 1480 nm and 1590 nm at a bending radius of 190 mm. As shown in tables 181 and 182, the described fiber design results in a significant difference in bending loss at the target wavelength 1480 nm and bending loss at 1590 nm, one Stokes shift beyond the target wavelength.

Figure 9:
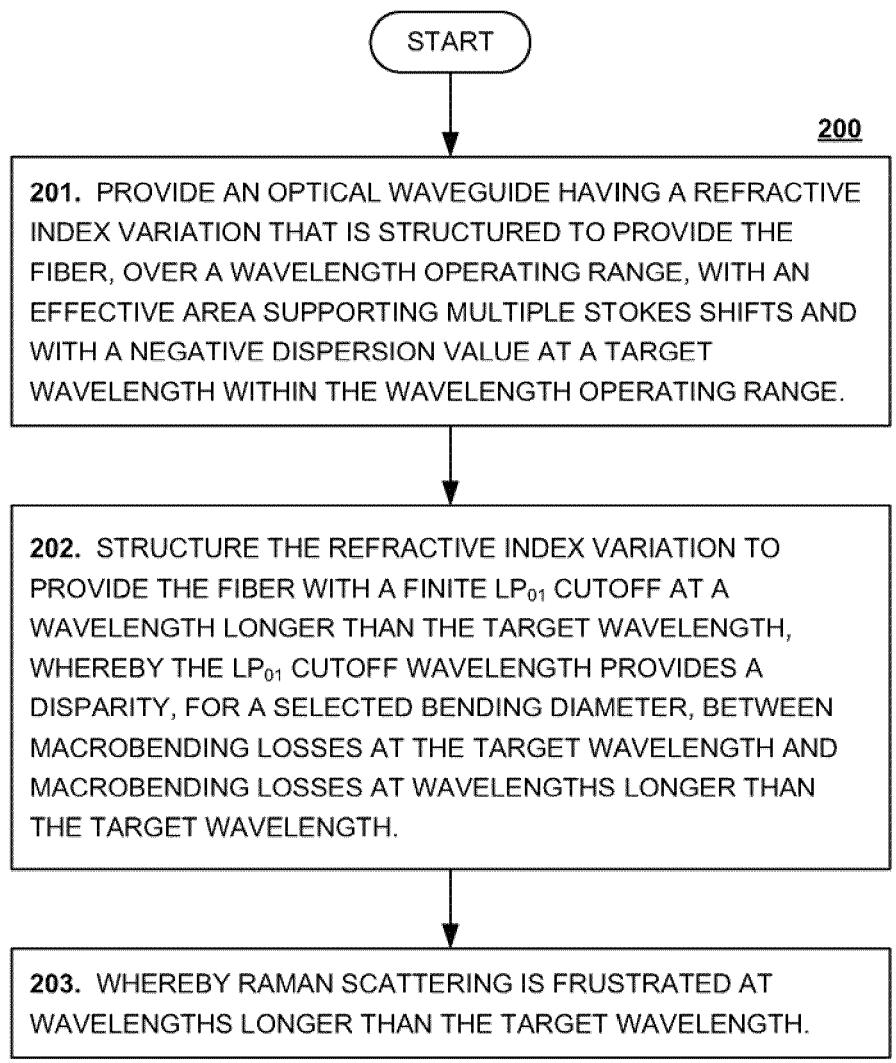
FIG. 9 is a flowchart of a general method according to various described aspects of the invention.

FIG. 9 is a flowchart setting forth a general method 200 for designing a filter fiber in accordance with various aspects of the invention set forth herein. The method includes the following components:

Box 201: Provide an optical waveguide having a refractive index variation that is structured to provide the fiber, over a wavelength operating range, with an effective area supporting multiple Stokes shifts and with a negative dispersion value at a target wavelength within the wavelength operating range.

Box 202: Structure the fiber to provide the fiber with a finite $LP_{01}$ cutoff at a wavelength longer than the target wavelength, whereby the $LP_{01}$ cutoff wavelength provides a disparity, for a selected bending diameter, between macrobending losses at the target wavelength and macrobending losses at wavelengths longer than the target wavelength.

Box 203: Whereby Raman scattering is frustrated at wavelengths longer than the target wavelength.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

We claim:

1. An optical fiber, comprising:
   an optical waveguide having a refractive index variation that is structured to provide the fiber, over a wavelength operating range, with an effective area supporting multiple Stokes shifts and with a negative dispersion value at a target wavelength within the wavelength operating range,
   wherein the refractive index variation is further structured to provide the fiber with a finite $LP_{01}$ cutoff at a wavelength longer than the target wavelength, whereby the $LP_{01}$ cutoff wavelength provides a disparity, for a selected bending diameter, between macrobending losses at the target wavelength and macrobending losses at wavelengths longer than the target wavelength,
   whereby Raman scattering is frustrated at wavelengths longer than the target wavelength.

2. The optical fiber of claim 1, wherein the refractive index variation comprises an azimuthal index variation.

3. The optical fiber of claim 1,
   wherein the refractive index variation comprises a radial index variation.

4. The optical fiber of claim 3,
   wherein the optical waveguide comprises a plurality of concentric regions, including a core, an inner cladding surrounding the core, and an outer cladding surrounding the inner cladding, each of the fiber regions having a respective outer radius and a respective refractive index difference.

5. The optical fiber of claim 1, wherein, for the selected bending diameter, the macrobending losses at the target wavelength are less than 0.01 dB/km, and the macrobending lasses at the one Stokes shift beyond the target wavelength are greater than 300 dB/km.

6. The optical fiber of claim 5, wherein the selected bending diameter corresponds to that of a fiber spool on which the filter fiber is wound.

7. The optical fiber of claim 5, wherein the refractive index profile has a central spike corresponding to the fiber care and a trench corresponding to the inner cladding, wherein the central spike has a positive refractive index difference and the trench has a negative refractive index difference.

8. The optical fiber of claim 5,
   wherein the outer cladding has an outer radius $r_0$, a refractive index $n_0$, and a refractive index difference $\Delta n=0$,
   wherein the core has an outer radius $r_1$, a refractive index $n_1$, and a refractive index difference $\Delta n_1 = n_1 - n_0$, and
   wherein the inner cladding has an outer radius $r_2$, a refractive index $n_2$ and a refractive index difference $\Delta n_2 = n_2 - n_0$.

9. The optical fiber of claim 8,
   wherein the target wavelength is 1480 nm, wherein the optical fiber has a first Stokes shift at 1590 nm and an $LP_{01}$ cutoff wavelength at 1590 nm, and
   wherein, ±10 percent,
   $r_1 = 2.0$ μm
   $\Delta n_1 = 0.01308$
   $r_2 = 12$ μm
   $\Delta n_2 = -0.008$.

10. The optical fiber of claim 8,
    wherein the target wavelength is 1480 nm, wherein the optical fiber has a first Stokes shift at 1590 nm and an $LP_{01}$ cutoff wavelength at 1590 nm, and
    wherein, ±10 percent,
    $r_1 = 2.5$ μm
    $\Delta n_1 = 0.00917$
    $r_2 = 6$ μm
    $\Delta n_2 = -0.008$.

11. The optical fiber of claim 8,
    wherein wavelength is 1480 nm, wherein the pt fiber has a first Stokes shift at 1590 nm and an $LP_{01}$ cutoff wavelength at 1590 nm, and
    wherein, ±10 percent,
    $r_1 = 2.0$ μm
    $\Delta n_1 = 0.01098$
    $r_2 = 12$ μm
    $\Delta n_2 = -0.004$.

12. The optical fiber of claim 8,
    wherein the target wavelength is 1480 nm, wherein the opt eat fiber has a first Stokes shift at 1590 nm and an $LP_{01}$ cutoff wavelength at 1590 nm, and
    wherein, ±10 percent,
    $r_1 = 1.8$ μm
    $\Delta n_1 = 0.01529$
    $r_2 = 8$ μm
    $\Delta n_2 = -0.008$.

13. A Raman amplifier comprising the optical fiber of claim 1.

14. A cascaded Raman resonator comprising the optical fiber of claim 1.

15. A method for making a filter fiber, comprising:
    providing an optical waveguide having a refractive index variation that is structured to provide the fiber, over a wavelength operating range, with an effective area supporting multiple Stokes shifts and with a negative dispersion value at a target wavelength within the wavelength operating range, structuring the fiber to have a refractive index variation that provide the fiber with a finite $LP_{01}$ cutoff at a wavelength longer than the target wavelength, whereby the $LP_{01}$ cutoff wavelength provides a disparity, for a selected bending diameter, between macrobending losses at the target wavelength and macrobending losses at wavelengths longer than the target wavelength, whereby Raman scattering is frustrated at wavelengths longer than the target wavelength.

16. The method of claim 15, further including:

providing a refractive index variation comprising an azimuthal index, variation.

17. The method of claim 15, further including:

providing a refractive index variation comprising a radial index variation.

18. The method of claim 17, further comprising:

providing an optical waveguide comprising a plurality of concentric regions, including a core, an inner cladding surrounding the core, and an outer cladding surrounding the inner cladding, each of the fiber regions having a respective outer radius and a respective refractive index difference.

19. The method fiber of claim 15, wherein, for the selected bending diameter, the macrobending losses at the target wavelength are less than 0.01 dB/km, and the macrobending losses at the one Stokes shift beyond the target wavelength are greater than 300 dB/km.

20. The method of claim 15, wherein the selected bending diameter corresponds to that of a fiber spool on which the filter fiber is wound.

21. The method of claim 17, wherein the refractive index profile has a central spike corresponding to the fiber core and a trench corresponding to the inner cladding, wherein the central spike has a positive refractive index difference and the trench has a negative refractive index difference.

22. The method of claim 17, wherein the outer cladding has an outer radius $r_0$, a refractive index $n_0$, and a refractive index difference $\Delta n=0$, wherein the core has an outer radius $r_1$, a refractive index $n_1$, and a refractive index difference $\Delta n_1=n_1-n_0$, and wherein the inner cladding has an outer radius $r_2$, a refractive index $n_2$ and a refractive index difference $\Delta n_2=n_2-n_0$.

23. The method of claim 22, wherein the target wavelength is 1480 nm, wherein the optical fiber has a first Stokes shift at 1590 nm and an $LP_{01}$ cutoff wavelength at 1590 nm, and wherein, ±10 percent, $r_1=2.0$ μm $\Delta n_1=0.01308$ $r_2=12$ μm $\Delta n_2=-0.008$.

24. The method of claim 22, wherein the target wavelength is 1480 nm, wherein the optical fiber has a first Stokes shift at 1590 nm and an $LP_{01}$ cutoff wavelength at 1590 nm, and wherein, ±10 percent, $r_1=2.5$ μm $\Delta n_1=0.00917$ $r_2=6$ μm $\Delta n_2=-0.008$.

25. The method of claim 22, wherein the target wavelength is 1480 nm, wherein the optical fiber has a first Stokes shift at 1590 nm and an $LP_{01}$ cutoff wavelength at 1590 nm, and wherein, ±10 percent, $r_1=2.0$ μm $\Delta n_1=0.01098$ $r_2=12$ μm $\Delta n_2=-0.004$.

* * * * *